E. S. PETTIS.
PROCESS AND APPARATUS FOR THE EXTRACTION OF PREGNANT CYANID SOLUTIONS FROM PULP.
APPLICATION FILED AUG. 12, 1913.

1,106,836.

Patented Aug. 11, 1914.
3 SHEETS—SHEET 1.

Fig. 1.

E. S. PETTIS.
PROCESS AND APPARATUS FOR THE EXTRACTION OF PREGNANT CYANID SOLUTIONS FROM PULP.
APPLICATION FILED AUG. 12, 1913.

1,106,836.

Patented Aug. 11, 1914.

UNITED STATES PATENT OFFICE.

EDSON S. PETTIS, OF SAN FRANCISCO, CALIFORNIA.

PROCESS AND APPARATUS FOR THE EXTRACTION OF PREGNANT CYANID SOLUTIONS FROM PULP.

1,106,886.  Specification of Letters Patent.  Patented Aug. 11, 1914.

Application filed August 12, 1913. Serial No. 784,364.

*To all whom it may concern:*

Be it known that I, EDSON S. PETTIS, a citizen of the United States, residing in the city and county of San Francisco and State of California, have invented new and useful Improvements in Processes and Apparatus for the Extraction of Pregnant Cyanid Solutions from Pulp, of which the following is a specification.
My invention relates to means whereby cyanid pulps, as known in metallurgical parlance, containing pregnant solutions of solids, are separated in order to free the solutions containing precious metals in a solvent state, from the valueless solids or residue.

The general object and nature of my invention is to accomplish in one operation and by means of a single apparatus this separation.

Said invention improves and combines the old decantation and slime thickening methods together with a new unsubmerged vacuum filtering method, thereby obtaining a complete extraction of precious metal values, and also effecting a great economy in time and cost of operation.

Our modern reduction plants for the extraction of precious metals from low grade ores by cyanidation involve the use of many appliances and distinct processes, necessitating grinding apparatus, processes of cyanid treatment and dissolution of values, thickening and filtering processes, and precipitation of value dissolved, with final discharging of the pulp on tailing dumps as residue.

The modern processes are continuous in nature, keeping the pulp in motion from the time it enters the reduction plant until it is deposited on the tailings pond in a valueless condition. In this procedure, after the precious metals have been dissolved in cyanid solution, the final extraction of this pregnant solution has developed into a continuous process treating an exceedingly finely ground pulp using many tanks of different design for thickening of pulps, pressure or vacuum filters and much machinery. The principal functions of the filters are to thicken the pulps in a pregnant solution by means of pressure, and displace the pregnant component solutions by means of pressure, with barren dilute solutions or water. Heretofore this operation necessitated two distinct apparatus, such as storage tanks for pulp, filtering apparatus with pumps, and other miscellaneous mechanical devices.

My invention is in an apparatus to overcome the two stages of procedure, extra tanks, and extra machinery, using but one apparatus:—a tank or vat which I have termed "receptacle", with movable parts therein which I have termed "combination".
My process is based on the well known principles in the science of ore treatment:

1. That solids, in dilute mixture, in a liquid of less density, discharge into a receptacle containing a dilute mixture, will settle within this liquid, gravitating to the bottom of receptacle in a thickened condition, if there be no physical disturbances therein. And when removed from the entire bottom of receptacle a homogeneous mixture is obtained.
2. That discharging dilute pulp of greater temperature, into a receptacle of less dilute pulp and of less temperature, but of the same characteristics, the liquids from the pulp of greater temperature will rise and remain at the top of receptacle, until such time as they become of the same temperature.

In ordinary terms, my present invention involves an apparatus, consisting of a tank container and movable parts as a combination, for the continuous separation of solids from pregnant solutions by gravitation of solids into an underflow of barren solutions, and continuously drawing off the rising pregnant solutions from solids over the top of the tank as an overflow, the settling of solids continuously through a barren solution into a water underflow, onto a filter medium and removing the thickened pulp in the valueless state from the filter and receptacle, continuously, by mechanical means.

The particular purpose is to extract valuable solutions from solids or semi-solids by flotation means in valueless solutions of the same characteristics and to thicken on a filter medium for further displacement of component solutions in one apparatus or series of same apparatus, to separate in part unfilterable material from a mixture of solids and liquids particularly relating to improvements of floating pregnant solutions from cyanid pulps, and the further filtering of such pulps, completely extracting precious metal solutions from such pulps in a continuous manner in one apparatus: to extract in stages, continuously, in one apparatus, pregnant solutions from cyanid pulps:—as 1. Displacing pregnant solutions with a barren solution, allowing the solids to settle into an underflow of barren solution.

2. Displacing the barren solutions with water, allowing the settling solids to deposit on a filter medium over which passes submerged chambers of water, displacing a component solution within the deposited pulp on the filter medium, directly under said chambers by means of water from the chambers percolating through the pulp on the filter medium.

3. Discharging continuously from the receptacle, by means of a revolving screw picking up the pulp from the filter medium, and worming it out through a centrally located revolving passageway.

4. To establish and maintain, due to the respective differences of solutions associating with solids at different depths of the receptacle, what I have termed: a, the "pregnant zone"; being that portion of dilute pulps in the upper part of the receptacle, containing precious metals in greater quantity; b, the middle portion of receptacle contents is the "barren zone"; being that portion of less dilute pulps containing little precious metal values of mixed solutions and solids; c, the bottom portion of receptacle contents is the "water zone; being that portion of greater density containing a chemically dilute solution and more barren pulp.

Solids in cyanid solutions are commonly known as "pulp", pulverized ore and moisture, in view thereof I have used that term in my description. Cyanid solutions containing appreciable amounts of gold and silver are termed "pregnant solutions" containing precious metals, in view thereof, I have used that term in my description. Cyanid solutions, having contained in solution precious metals and precipitated therefrom by chemical means, after which they become barren of precious metals, are termed "barren solutions" regenerated solutions, in view thereof I have used that term in my description. "Barren solutions" containing little precious metal values or less than pregnant.

Having reference to the accompanying drawings.

Referring to the drawings; A indicates a tank of considerable depth, having a sloping bottom 2, which is divided into a suitable number of separate divisions, indicated at 3, by upwardly extending ribs 4, upon which is placed a suitable filtering material B, such as burlap, canvas, etc. A suitable number of independent separate filtering chambers are thus formed through which a liquid may be injected into the tank or withdrawn from same. The tank as a whole is carried in the frame C and is further supported on a central thrust bearing 5, provided with a stuffing-box 6 at its lower end. Extending through the stuffing-box 6 is a tubular driving shaft having a flared open head to which is secured a conical-shaped hollow head 9. Secured to the top of the head 9 is an upwardly extending secondary driving shaft 10, suitably journaled, as at 11 and 12, in the upper portion of the frame. Secured to the shaft at 13 and revoluble with same is a pair of annular launders 14 and 15, and connected with same is a pair of radially disposed distributing pipes 14$^a$ and 15$^a$; the pipes 14$^a$ being connected with the launders 14 and likewise the pipes 15$^a$ are connected with the launder 15. Adjustably suspended by rods 16, carried by the supporting frame C in juxtaposition with relation to the distributer pipes 14$^a$ and 15$^a$ is a series of open ended, vertical cylinders 17, 18 and 19.

The cyanid pulp containing solids, as unseparated sands and slimes, and pregnant solutions, as precious metals in cyanid solution, coming direct from the grinding apparatus or treatment vats, enters the receptacle A and is distributed evenly over the surface of the receptacle contents from launder 14 through pipes 14$^a$ with numerous openings, passing horizontally in a circular motion, into a partially submerged vertical cylinder 17. The pulp as distributed, gravitates from this cylinder into another and larger vertical open-ended cylinder 18, wholly submerged in and below the surface of the contents of the receptacle A. Settling into this cylinder 18 the pregnant solution of the dilute pulp rises over the sides of this cylinder, and guided by a third vertical open-ended cylinder 19 partly submerged, and at the extreme outer sides of the receptacle, continues to rise finally overflowing the top of receptacle into an overflow launder 20. This is the current flow of the "pregnant zone". As the solids gravitate within the second wholly submerged, or midway cylinder 18, this settle into a midway underflow of barren solution, which is evenly distributed through horizontal pipes 15$^a$ with numerous openings and extending outward from the center of the receptacle, midway its contents, and moving slowly in a circular motion; the barren solution being admitted from any suitable source through pipe 21 to launder 15 and thence by pipes 22 to the distributing arms 22. This barren solution distribution is to displace the pregnant solution; receiving the settling solids and causing the pregnant solutions to rise and overflow the receptacle, being in quantity less than the pregnant solution entering with pulp inflow to receptacle, but sufficient to displace the pregnant solution of settling pulp at this juncture. A slight portion of the pregnant solution mixes with the barren solution at this juncture, passing into the "barren zone" with the solids, and in view thereof, the greater part of this mixed solution is drawn (at this depth of contents) out of the receptacle through small regularly spaced valved openings 23 in the sides of the receptacle. This is the current flow of the "barren zone". These intermediate outlets 23 have an inside deflection piece 25 attached to the receptacle sides and extending below at an angle to shear away or deflect solids settling from a higher plane from passing out with the liquids. The discharge of cloudy solutions, from these intermediate outlets of the barren zone, is regulated by the valves 23 on the outside, allowing an exit of the mixed solutions in quantity sufficient to maintain a clear overflow of pregnant solutions from the receptacle, obtaining a rich clear solution for precipitation of values contained. Near these intermediate outlets, and at the lower edge of the deflector, the contents of the receptacle may be heated by the use of steam coils 26 supplied with the apparatus, to increase a separation and settling of solid matter near these outlets, furnishing a clearer flow of solution from the openings. In this manner of flotation of pregnant solutions, very little of the precious metal contents entering the receptacle will gravitate with the solids to the filter medium.

The top inflow of pulp (solids plus two or three times their weight of solutions) is greater in bulk than the discharge of the thickened pulp from the bottom of the receptacle. Hence an overflow of solution, clear of solids and rich in values passes from the top of receptacle by means of the encircling launder 20. This solution is precipitated of its values and a portion, or the whole, is returned "barren" to this same receptacle, entering through the submerged midway distributer arms 15ᵃ as the barren underflow. The mixed solutions passing from the midway openings 23 contain but a small percentage of solids and but little precious metal values, are suitable for use in previous grinding or treatment of pulps in part or in whole. On the other hand, a portion or the whole, may be returned to the pulp inflow of this same receptacle or another receptacle employing this process. In this case the overflow pregnant solutions would become dilute of values. Below these cylinders, aforesaid, and outlets, the pulp gravitates much faster and continually thickens as it nears the conical bottom of the receptacle.

Suitably secured, as at 27 and 28, on the sides of the hollow conical head 9 inside tank 2 and slowly revolving over the surface of the filter medium B are the radially disposed housings 29, 30 and 31. These housings are open on the bottom and house respective spray pipes 29', 30' and 31' and constitute submerged water chambers, as later described.

Suitably journaled within the housing 29 is a conveyer or screw 32 discharging into the column 7. Upon the inner end of screw 32 is mounted a gear 33, which is so positioned as to intermesh with a bevel gear 34, secured, as at 35, upon a shaft 36 journaled in the head 9 and an elbow 37 into which the lower end of the driving tube extends. Secured, as at 38, upon the driving tube is a worm wheel 39, which is so positioned as to intermesh with a driving worm 40 mounted upon the shaft 41, suitably journaled with relation to the main frame C. Mounted upon the lower end of the shaft 36 is a similar worm wheel 42, connected with a worm gear 43 mounted upon a shaft 44 similarly journaled with relation to the main frame C. Connecting the two shafts, as indicated at 45, is a driving belt or similar connection. Power applied to the main driving shaft 40 is thus not only transmitted through the worm wheel 39 to revolve the column 7, with connected secondary driving shaft 10, with the radially disposed distributer arms 14ᵃ and 15ᵃ and radially disposed housings 29, 30 and 31, but is also transmitted to shaft 44 and worm wheel 42 to revolve the shaft 36 with connected gears 33 and 34, thus causing the conveyer or screw 32 to be revolved independently with relation to the revolving movement of the column 7 and connected housings 29, 30 and 31. The ratio of gear transmission between the worms 40 and 39 is such that the hollow head 9, with connected housings 29, 30 and 31, will be very slowly revolved. The movement of the secondary driving shaft 10 with connected distributer arms, and launders, is very slow; the speed of revolution being so slow as to prevent any agitation of the liquid within the tank or the solids precipitating through same. Water or weak solution may be conveyed to the several spray nozzles in the housings 29, 30, 31 through the pipes 60.

Figures 4, 5, 6, 7:
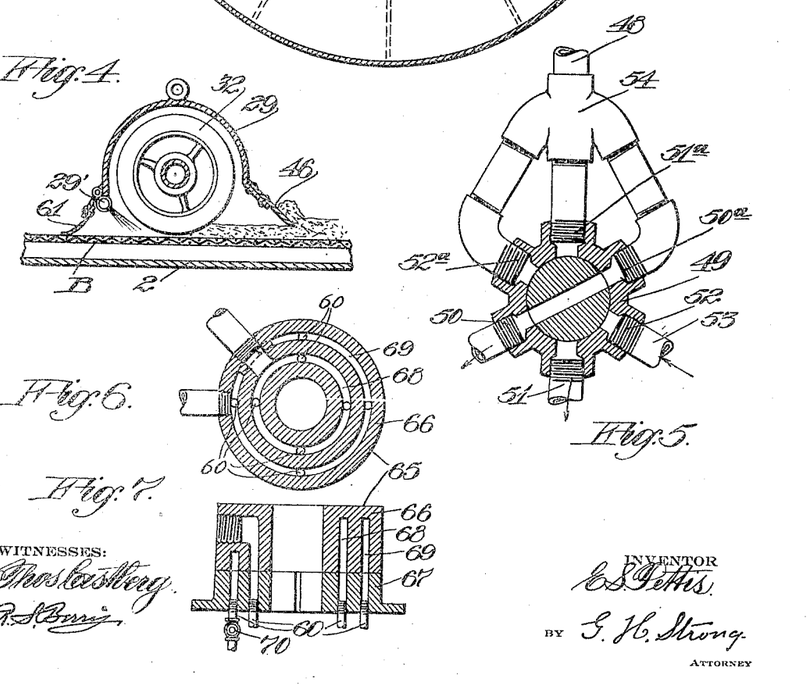
Fig. 4 is a cross section of the screw conveyer.
Fig. 5 is a cross section of the filter compartment controlling valves.
Fig. 6 is a plane section of the water distributing valve on line V—V, Fig. 1.
Fig. 7 is a vertical section through the water distributing valve.

By referring to Fig. 4, it will be seen that the forward portion of the housing 29 is provided with a scraper blade 46 which to a certain extent adjusts the depth of the cake upon the filtering medium. The remaining thickness of the cake not acted on by the scraper 46 is thus cut up by the conveyer 32 and forced down through the housing 29 into the hollow head 9, from where it is finally discharged through the column 7 and elbow 37 from where it may be conveyed to the tailing dump. The rear portion of the housing 29 is provided with a spray pipe, indicated at 29', which assists to loosen the cake. The liquid discharged through the pipe 29' is prevented from mixing with or diluting the surrounding liquid, and its action is limited by the inclosing housing 29. The housings indicated at 30 and 31 are constructed very similar to the housing 29 except that the conveyer 32 is omitted, and except also, they are closed at both ends, but open at the bottom. The forward portions of the housings 30 and 31 are also provided with scrapers 46ᵃ and 46ᵇ, similar to scrapers 46 on housing 29, which partly reduce the depth of the cake before it is finally acted on and removed by the conveyer 32. The scraper 46ᵇ on the housing 31 for example, may reduce the cake from four inches to three inches while the scraper 46ᵃ following in the path of the scraper 46ᵇ may reduce the cake to two inches. The thickness of the cake is further reduced by scraper 46 so that by the time it is finally cut up by the conveyer 32 any clogging of the conveyer is thus eliminated and a constant removal of the cake from the covering of the several filter compartments is thus insured. The spray pipes 30', 31', contained within the housings 30 and 31, are provided for the purpose of washing and leaching the cake before this is removed by the conveyer, thus removing any cyanides or values which might possibly remain in the cake. These housings also confine the water from the pipes 30', 31' from being mingled with the component solution of the surrounding solids. 61 is a flexible flap section hinged to the back of the housings 29, 30, 31, which extends downward to the filter medium dragging behind the spray pipe chambers as the latter revolve and acting to contain the wash water or wash solution within the chambers.

Figure 1:
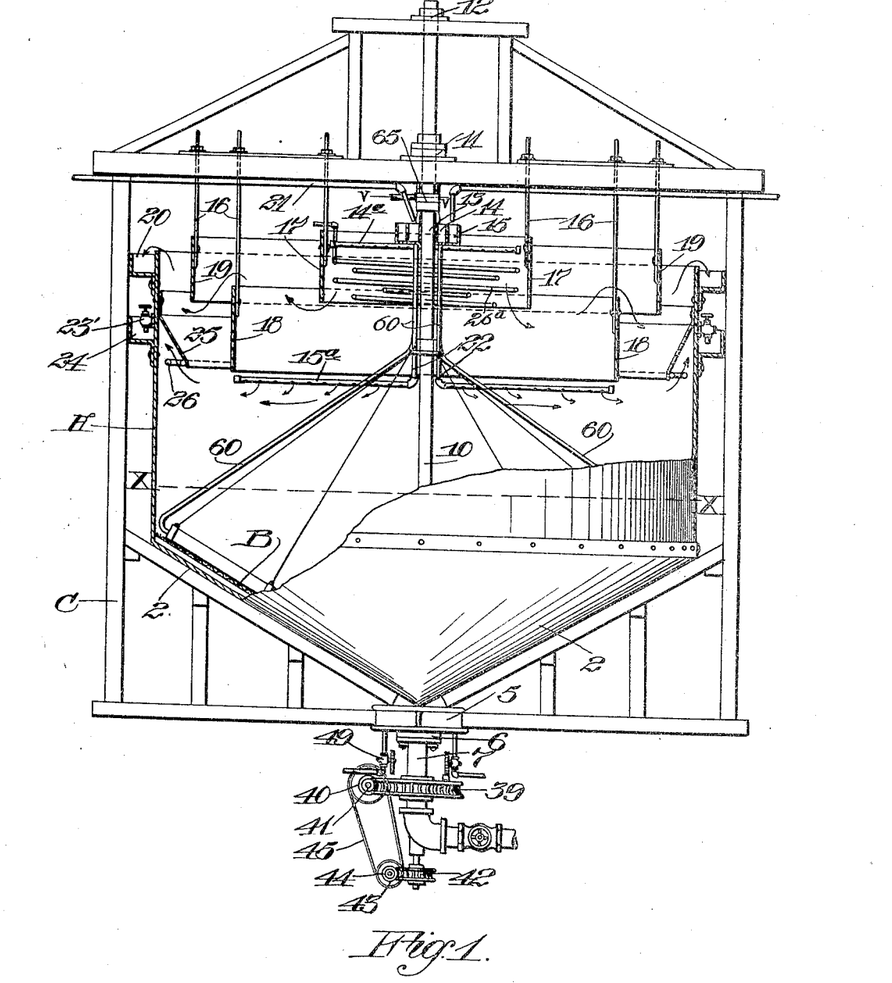
Figure 1 is a side elevation of the apparatus partly in section.
Figure 2:
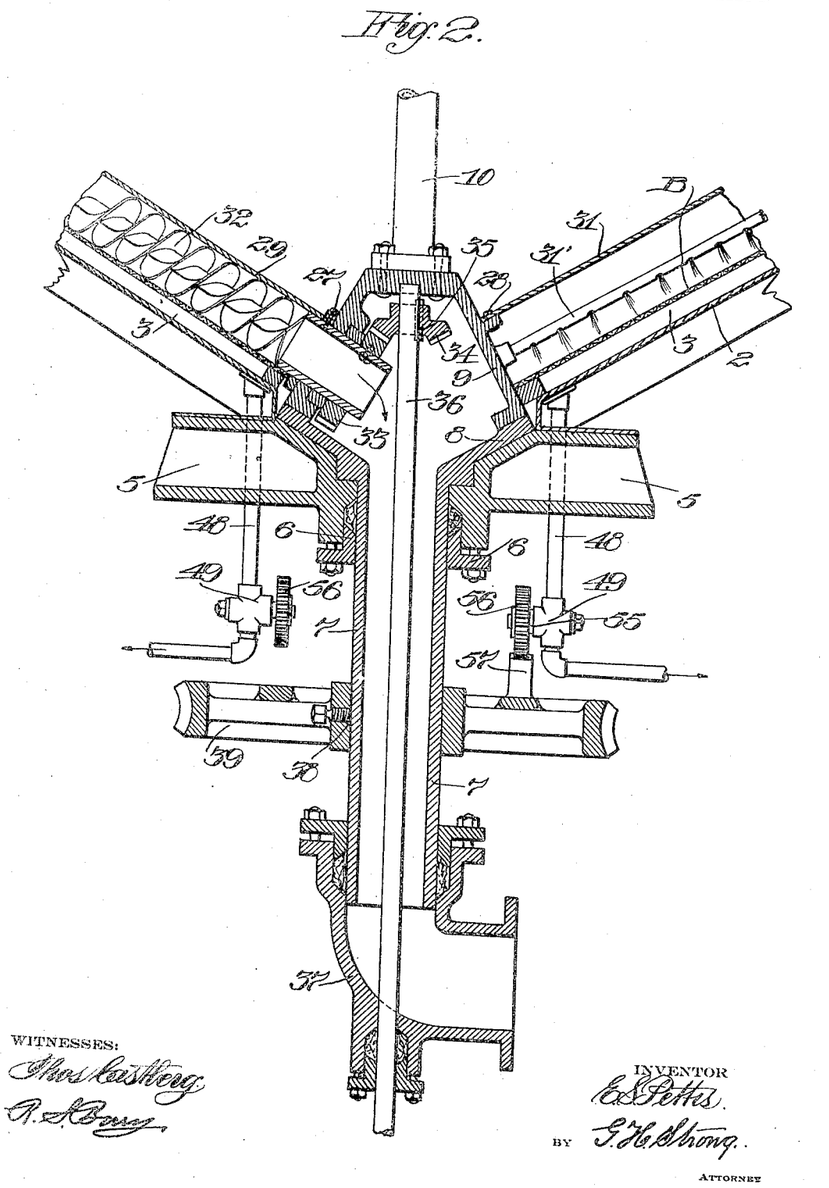
Fig. 2 is an enlarged central section through the lower portion of the apparatus.
Figure 3:
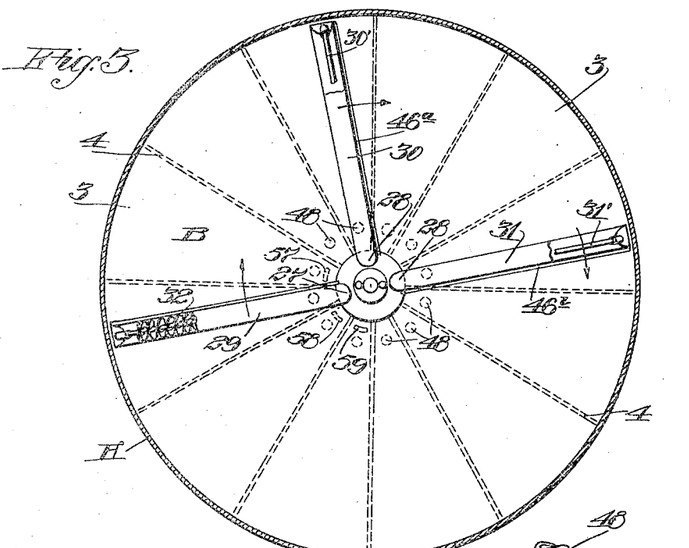
Fig. 3 is a section on line X—X, Fig. 1.

By referring to Fig. 2, the lower end of each filter compartment 3 is connected by pipes 48 with respective multiple-way valves 49, which latter are more clearly shown in the enlarged section of Fig. 5; the lower ends of the valves having three openings 50, 51 and 52. The opening 50 is connected to a vacuum pump or similar means, not necessary here to be shown; the opening 51 is a drain opening; while the opening 52 is connected through a pipe 53 with a water supply under-pressure, not shown; said pressure being slightly in excess of the liquid pressure in the lower portion of the receptacle A. The upper portions of the valves are similarly provided with outlets 50ᵃ, 51ᵃ and 52ᵃ, which in turn are connected by a three-way connection 54 which connects the outlet openings with the pipes 48. It will be understood that each filter compartment 3 is provided with a pipe 48 and that each pipe in turn is provided and connected with a respective valve 49. Each valve 49 is provided with a stem 55, upon the outer end of which is mounted a gear 56 which is provided for the purpose of turning the valve into register with one connection or the other. The gears 56 are intermittently and successively operated by the successively arranged gear segments 57, 58, 59, mounted upon the worm wheel 49. These segmental racks 57, 58, 59 will by reason of the revolution of worm wheel 49 with relation to the fixedly positioned valves 48, turn the gears 56 and correspondingly turn one valve or another into the desired position. For instance, normally a valve 49 will assume the position indicated in Fig. 5 which shows it connected with the vacuum producing means. A valve being set in this position will cause a certain vacuum within its respective filtering compartment 3, which will cause liquid from above to percolate through the filtering medium and will also cause all wash liquids supplied by the spray pipes 29', 30', 31' to be removed. The rack segments 57, 58, 59 are positioned on the worm 39 in such relation to the superposed traveling conveyer housing 29 that as said housing 29 with its contained conveyer arrives over or approaches a filtering compartment 3, the gear 56 belonging to the valve 49 which controls that particular filtering compartment 3 will first engage the rack 57, turning valve 49 so as to shut off connection with the vacuum producing means and place that particular compartment in communication with the water pressure supply pipe 53 (Fig. 5). This results in an inflow of water or dilute solution under pressure slightly in excess of the pressure above the filter. This is to free the pulp from the canvas as the screw 32 picks it up. As the screw 32 passes from over this particular filter compartment the water flow is cut out from this compartment by the operation of the rack 58 turning the valve of this compartment so as to allow the latter to drain through pipe 51. This drainage is but momentary, or sufficient to allow the principal volume of water in the compartment to flow out, whereupon the next rack 59 comes into play to turn the valve of this compartment so as to connect the latter with the vacuum producing means and thus it remains turned to the vacuum side of the apparatus until the screw again approaches this compartment. This cycle of operations takes place with each valve successively, so that each compartment 3 is treated successively to the action of a vacuum or a negative pressure, on the underside of the filtering medium less than the pressure on the opposite side; 2, to a water pressure from below in excess of the pressure on the opposite side of the filtering medium; and 3, to an intermediate condition of gravity drainage. The entrance of a clear liquid such as water or a diluted solution into the bottomless chambers in the housings 29, 30, 31, within the receptacle in small quantities fills these chambers with a clear filterable liquid of much less density and specific gravity than the solvent liquid, or component solution in the receptacle. (The original solvent or cyanid solution which impregnates the cake is known as a component solution, as distinguished from the wash water or dilute solution used to displace the original solution.) When the interiors of these chambers are not subjected to greater pressure than that exerted by the pulp on the outside, the pulp being of greater density and specific gravity, will substantially maintain the thin liquid within the chambers and prevent it from escaping into and mingling with the main bulk of the receptacle contents. Under these conditions the pulp on the filter medium directly under the chambers receives localized treatment not possible nor contemplated in any other method or apparatus of which I have knowledge. The clear filterable liquid within the chambers easily percolates the thin layer of pulp beneath, displacing or forcing before it the original component in the pulp. The plows maintain a perfect condition for filteration under the chambers and when suction is applied beneath, the rate of percolation is increased.

The operation is briefly as follows: The pregnant solution from any suitable source is delivered to the receptacle centrally and within the vertical cylinder 17. If the solution has not been heated previously it may be heated by means of the heating coils 26ª. Under some circumstances the pulp may be treated cold. The several cylinders 17, 18, 19 are designed to intercept the outflow of the solid particles contained in the pregnant solution and to assist in directing them to settle by gravity into the receptacle. The down-flow of pregnant solution is met by a counter up-flow of barren solution from the revolving supply pipes 15ª. The cylinders 17, 18, 19 are adjustable up and down to regulate the settling of the solids and the lateral over-flow proportionally to the counter disturbances caused by the counter discharges of the pregnant and barren solutions. For instance, when an up-flow of barren solution tends to carry the solid particles delivered into the apparatus with the pregnant solution upward and over the cylinder 18; under which circumstances it would be advisable to raise the cylinder 18. The pregnant solution relieved of its solids is drawn off from the rim over-flow at 20. A secondary drainage of solution is accomplished through the valves 23. The pulp settling from the pregnant solution through a barren solution under-flow becomes deposited on the filter medium B. The wash water chambers 29, 30, 31, assist in forming a thin layer of thick pulp on the filter and the clear liquid from the chambers to percolate and displace the component solution passing through the filtered medium; the pulp being subsequently picked up by and continuously removed by the covered revolving screw which travels continuously over the filter; the action of pulp removal being assisted by the cycle of movements accomplished by the valves 49.

The use of heated pulp—heated before entering the receptacle, or within the first cylinder of the apparatus—is beneficial in the treatment of low gravity pulps, and establishes and maintains three distinct zones of solution of different temperature and serves to give a more complete extraction and better separation of the pregnant solutions from the solids. These "zones" are located relatively or approximately at the top, middle and bottom of the receptacle, as follows: As the pregnant pulp enters the receptacle contents previously heated at this particular entrance, the liquids have a tendency to rise and overflow at the top of the receptacle. The entrance of a barren solution of less temperature, enters below the heated pulp midway in the receptacle contents has a tendency to remain below the pregnant solution zone of greater temperature. The entrance of water or dilute solution of less temperature than the barren zone, enters the contents of the receptacle below the barren zone and has a tendency to remain below the barren solution zone.

I do not limit the application of this process to pulps of high temperature exclusively, or to the heating of pulps in the process. Although extremely beneficial in the treatment of pulps of colloidal texture, it would not be necessary in the application on pulps of granular texture and average specific gravity settling with greater rapidity and enabling the use of more barren solution in the process. The agitation of most cyanid pulps before entering my process, tend to raise their temperature sufficiently, ordinarily speaking. Neither do I limit this process exclusively to the use of a suction within the filter compartments, as in the application of pulps of more or less granular texture deposited on the filter medium or leachable under a low pressure already evident in this process.

In the treatment of some ores the ultimate and complete extraction of cyanid solution from the cyanid pulps is not essential after the precious metal solutions have already been extracted, as in my process, inasmuch that the extraction of precious metals takes place before the thickening of these pulps and a partial displacement of barren solution dilute in chemicals with water wash from the component solids may be accomplished with a low pressure.

For economical reasons in the filtration of a mixed pulp of combined granular and colloidal textures, it is not always profitable to completely extract the last traces of component dilute cyanid solutions, in view of the fact that the precious metal solutions have previously been extracted by displacement of this dilute solution.

The spray pipes 29′, 30′ and 31′ mounted in their respective housings, may be supplied from any suitable source of pressure supply, but the flow of same is preferably regulated and controlled by a distributer valve 65, which is connected with the spray pipes through pipes 60. The distributer valve consists of a stationary head 66 (Figs. 6 and 7) suitably secured to the stationary frame C, and a revolving manifold connection 67, secured to shaft 10, to which the pipes 60 connect. Water under pressure enters the stationary head 66 and is then distributed through channels 68 and 69 and the manifold plate 67 to the several connected pipes 60, when the flow of water may be further regulated by valves 70. A perfectly even distribution of wash water may then be secured the flow of which may be regulated by valves 70 to suit various grades of pulp and thickness of cake on the filter bottom.

Having thus described my invention what I claim and desire to secure by Letters Patent is—

1. An apparatus for separating pregnant solution from solids contained therein, consisting in combination of a tank, means for introducing and distributing pulp into the top portion of the tank, means for simultaneously introducing into the tank a counter underflow of barren solution, yet allowing the solids to gravitate continuously and thicken in the solution underflow, and means for recovering the pregnant solution, mixed solution, and thickened pulp separately, substantially as described.

2. An apparatus for treating solids in solution, which consists in combination of a settling receptacle, a centrally disposed submerged vertical open ended cylinder, into which the pulp discharges, concentric cylindrical adjustable partially submerged baffles, means within the receptacle and below the baffles for introducing an upward flow of barren solution counter to the downward inflow of pregnant solution and solids in suspension, and means for recovering the settled solids separate from the pregnant and barren solution.

3. An apparatus for treating pregnant cyanid solutions, which consists in the combination of a settling receptacle, a centrally disposed, partially submerged, vertical open ended cylinder into which the pregnant solution discharges, concentric cylindrical adjustable submerged baffles, means within the receptacle and below the baffles for introducing an upward flow of barren solution counter to the downward inflow of pregnant solution, and means for recovering the settled solids separate from the pregnant and barren solutions.

4. In an apparatus for treating pulps, the combination of a receptacle having a filter bottom, an open bottom chamber movable over the filter, having means for continuously removing the filtered pulp from the receptacle.

5. In an apparatus for treating cyanid solutions, the combination of a receptacle having a filter bottom, a plurality of separated radially arranged compartments under said filter bottom and into which the filter directly drains, a radially disposed, traveling, revolving screw conveyer working immediately over the filter bottom and operative to move accumulations thereon to a central point of discharge, and vacuum-producing and washing means on the opposite side of the filter bottom from the conveyer, and means for alternating the action of said vacuum-producing and washing means as the conveyer travels over successive compartments.

6. The combination of a settling tank having a stationary filter bottom and a continuously moving open bottom sluicing chamber operative over the filter bottom the latter having a central discharge through the bottom of the tank.

7. A settling tank having a filtered bottom provided with a series of filtering compartments, a submerged bottomless wash water chamber movable over the filter bottom, and means for withdrawing the contents of the filter compartments.

8. The combination in a settling tank having a filter bottom divided into filtering compartments, of a submerged covered conveyer successively movable over the compartments and means working in conjunction with the conveyer to apply a water pressure in the compartment underneath the cake to loosen the same prior to the removal of the cake by the conveyer.

9. The combination of a settling tank having a filter bottom and a radially disposed submerged open bottom wash water chamber movable over the filter bottom, substantially as described.

10. The combination in a settling tank having a filter bottom divided into filtering compartments, of a submerged covered conveyer successively movable over the compartments, means working in conjunction with the conveyer to apply a water pressure in the compartment underneath the cake to loosen the same prior to the removal of the cake by the conveyer, and means by which the conveyer discharges out at the bottom of the tank.

11. An apparatus for displacing a component solution of thickened pulp in a filter bottom tank, consisting in combination a tank having a filter bottom, submerged open bottom washing chambers passing in close proximity to the filter, means for applying suction to the under side of the filter, means for coördinately applying water pressure to the under side of the filter in juxtaposition to the water chambers, to loosen the filtered cake formed, and means of continuously removing the cake from the filter medium.

12. An apparatus for continuously separating pregnant solution and solids contained therein, comprising in combination a tank, an open ended cylinder submerged in contents of the tank, means for introducing pulp into the cylinder, a submerged distributer moving horizontally in a circular motion within or below the submerged cylinder introducing a solution underflow to displace and cause the pregnant solution to rise out of the cylinder and mix with the solution in the top portion of the tank as the solids settle and gravitate with the solution underflow, means for collecting a clear overflow from the main tank, and means for removing the thickened pulp from the receptacle.

13. The combination with a settling tank having a stationary filter bottom and means whereby a chamber of clear liquid passes over and close to but spaced from and above the filter medium, plowing up a portion of settled thickened pulp and adapted to leave a thin layer of pulp.

14. An apparatus for continuously separating pregnant cyanid solutions and solids contained therein, comprising in combination a tank, a filter bottom in said tank, a tubular shaft projecting through the bottom, a hollow head inside of the tank connected with said tube, a shaft extending up through the tank secured to the head, a pair of distributing launders mounted on the shaft, means for conveying pulp to one of the launders and barren solution to the other, a distributer pipe mounted on the shaft connected with the pulp launder adapted to distribute the pulp in the top portion of the tank, a distributer pipe mounted on the shaft connected with the barren solution launder adapted to introduce the barren solution beneath the inflow of pulp, means for revolving the tubular shaft with connected head shaft, launders and distributer arms, and means for removing through the tubular shaft the solids collected on the filter bottom.

15. An apparatus for continuously separating pregnant cyanid solutions and solids contained therein, comprising in combination a tank, a filter bottom in said tank, a tubular shaft projecting through the bottom, a hollow head inside of the tank connected with said tube, a shaft extending up through the tank secured to the head, a pair of distributing launders mounted on the shaft, means for conveying pulp to one of the launders and barren solution to the other, a distributer pipe mounted on the shaft connected with the pulp launder adapted to distribute the pulp in the top portion of the tank, a distributer pipe mounted on the shaft connected with the barren solution launder adapted to introduce the barren solution beneath the inflow of pulp, means for revolving the tubular shaft with connected head shaft, launders and distributer arms, means for heating the pulp in the upper portion of the tank, means for removing the mixed solution formed between the pulp and barren solution, and means for removing the solids collected on the filter bottom.

16. An apparatus for continuously separating pregnant cyanid solutions and solids contained therein, comprising in combination a tank, a filter bottom in said tank, means for introducing and distributing pulp into the top portion of the tank, means for introducing a barren solution beneath the inflow of pulp to displace and overflow the pregnant solution as the solids settle, means for heating the pulp in the upper portion of the tank, means for removing the mixed solution formed between the pulp and barren solution, means for washing the solids, and means for removing the solids collected on the filter bottom.

17. An apparatus for continuously separating pregnant cyanid solutions and solids contained therein, comprising in combination a tank, a filter bottom in said tank, means for introducing and distributing pulp into the top portion of the tank, means for introducing a barren solution beneath the inflow of pulp to displace and overflow the pregnant solution as the solids settle, means for heating the pulp in the upper portion of the tank, a series of open-ended cylinders adjustably mounted in the upper portion of the tank, means for removing the mixed solution formed between the pulp and barren solution, and means for removing the solids collected on the filter bottom.

18. An apparatus for continuously separating pregnant cyanid solutions and solids contained therein, comprising in combination, a tank, a filter bottom in said tank, a tubular shaft projecting through the bottom, a hollow head inside of the tank connected with said tube, a shaft extending up through the tank secured to the head, a pair of distributing launders mounted on the shaft, means for conveying pulp to one of the launders and barren solution to the other, a distributer pipe mounted on the shaft connected with the pulp launder adapted to distribute the pulp in the top portion of the tank, a distributer pipe mounted on the shaft connected with the barren solution launder adapted to introduce the barren solution beneath the inflow of pulp, means for revolving the tubular shaft with connected head shaft, launders and distributer arms, means for heating the pulp in the upper portion of the tank, means for removing the mixed solution formed between the pulp and barren solution, a radially disposed housing mounted on the hollow head opening into the head, means mounted on the housing for removing the solids collected on the filter bottom, and a plurality of radially disposed housings secured to the hollow head having spray pipes mounted therein.

19. An apparatus for continuously separating pregnant cyanid solutions and solids contained therein, comprising in combination, a tank, a filter bottom in said tank, a tubular shaft projecting through the bottom, a hollow head inside of the tank connected with said tube, a shaft extending up through the tank secured to the head, a pair of distributing launders mounted on the shaft, means for conveying pulp to one of the launders and barren solution to the other, a distributer pipe mounted on the shaft connected with the pulp launder adapted to distribute the pulp in the top portion of the tank, a distributer pipe mounted on the shaft connected with the barren solution launder adapted to introduce the barren solution beneath the inflow of pulp, means for revolving the tubular shaft with connected head shaft, launders, and distributer arms, means for heating the pulp in the upper portion of the tank, means for removing the mixed solution formed between the pulp and barren solution, a radially disposed housing mounted on the hollow head opening into the head, means mounted on the housing for removing the solids collected on the filter bottom, a plurality of radially disposed housings secured to the hollow head, scrapers mounted on the forward portions of said housings, and spray pipes mounted within the housings.

20. An apparatus for continuously separating pregnant cyanid solutions and solids contained therein, comprising in combination, a tank, a filter bottom in said tank, a tubular shaft projecting through the bottom, a hollow head inside of the tank connected with said tube, a shaft extending up through the tank secured to the head, a pair of distributing launders mounted on the shaft, means for conveying pulp to one of the launders and barren solution to the other, a distributer pipe mounted on the shaft connected with the pulp launder adapted to distribute the pulp in the top portion of the tank, a distributer pipe mounted on the shaft connected with the barren solution launder adapted to introduce the barren solution beneath the inflow of pulp, means for revolving the tubular shaft with connected head shaft, launders and distributer arms, means for heating the pulp in the upper portion of the tank, means for removing the mixed solution formed between the pulp and barren solution, a radially disposed housing mounted on the hollow head opening into the head, means mounted on the housing for removing the solids collected on the filter bottom, a plurality of radially disposed housings secured to the hollow head, scrapers mounted on the forward portions of said housings, spray pipes mounted within the housings, and means for controlling the flow of water through said spray pipes.

21. The combination with a settling tank having a stationary filter bottom, of a plurality of radially disposed submerged open bottom wash water chambers movable over the filter bottom, spray pipes in said chambers, a distribution valve with which said pipes are connected, and means interposed between the distributer valve and spray pipes for controlling the flow through the spray pipes.

22. An apparatus for continuously separating pregnant solution and solids contained therein, comprising in combination, a tank, an open ended cylinder submerged in contents of tank, means for introducing pulp into the cylinder, a submerged distributer moving horizontally in a circular motion within or below the submerged cylinder introducing a solution underflow to displace and cause the pregnant solution to rise out of the cylinder and mix with the solution in the top portion of the tank as the solids settle and gravitate with the solution underflow, means for collecting a clear overflow from the main tank, means for continuously recovering a partially clear solution, below the main tank overflow, rising from the discharge of submerged cylinder, means for removing the thickened pulp from the tank, and means for removing the thickened pulp from the receptacle.

23. A receptacle having a filter bottom provided with a series of filtering compartments, radially disposed submerged scrapers movable in close proximity over the filter bottom, means for alternately creating a vacuum on and applying wash water against, the under-side of each filter section, and means for removing continuously the thickened pulp left on the filter.

24. In combination a settling receptacle, filter bottom in said receptacle, radially disposed adjustable plows movable continuously over and in close proximity to the filter medium, and means for continuously removing the filtered pulp from the receptacle, submerged sluicing means movable and coöperating with, said plows, and vacuum producing and washing means on the opposite side of the filter bottom and coacting with the sluicing means.

25. An apparatus in combination with a settling receptacle, a radially disposed open bottom sluicing chamber revolving in close proximity to the bottom of the receptacle, a central discharge through the bottom of the receptacle and a screw in said sluicing chamber discharging the solids radially into said central discharge.

In testimony whereof I have hereunto set my hand in the presence of two subscribing witnesses.

EDSON S. PETTIS.

Witnesses:
IRVINE SINNETT,
R. B. TREAT.